United States Patent [19]

Häfner

[11] 4,213,509
[45] Jul. 22, 1980

[54] HYDROSTATIC SETTING APPARATUS FOR SUPPORT OF LOADS

[75] Inventor: Hans W. Häfner, Köhlenthal, Fed. Rep. of Germany

[73] Assignee: Pfister GmbH, Augsburg, Fed. Rep. of Germany

[21] Appl. No.: 971,542

[22] Filed: Dec. 20, 1978

[30] Foreign Application Priority Data

Dec. 27, 1977 [DE] Fed. Rep. of Germany ....... 2758340

[51] Int. Cl.² ...................... G01G 21/02; F15B 15/02
[52] U.S. Cl. ..................................... 177/199; 74/110; 308/5 R; 177/DIG. 9
[58] Field of Search ................................ 177/132–135, 177/199, 200, DIG. 9; 308/5 R, 3 A; 74/110; 33/162; 73/781, 817, 858

[56] References Cited

U.S. PATENT DOCUMENTS

| 1,218,771 | 3/1917 | Hoeschen | 74/110 |
| 1,751,646 | 3/1930 | Nieman | 74/110 |
| 3,266,329 | 8/1966 | Sellers | 74/110 |
| 3,993,149 | 8/1975 | Harvey | 177/163 |

Primary Examiner—Joseph W. Hartary
Attorney, Agent, or Firm—Hill, Van Santen, Steadman, Chiara & Simpson

[57] ABSTRACT

A scale mechanism in which a load to be measured sets on blocks of which at least two are tapered and with a fluid such as oil between the blocks and means for measuring the transverse force on at least one of the tapered blocks and such measurement convertible to the weight of the load. Various modifications of the arrangement are disclosed.

4 Claims, 10 Drawing Figures

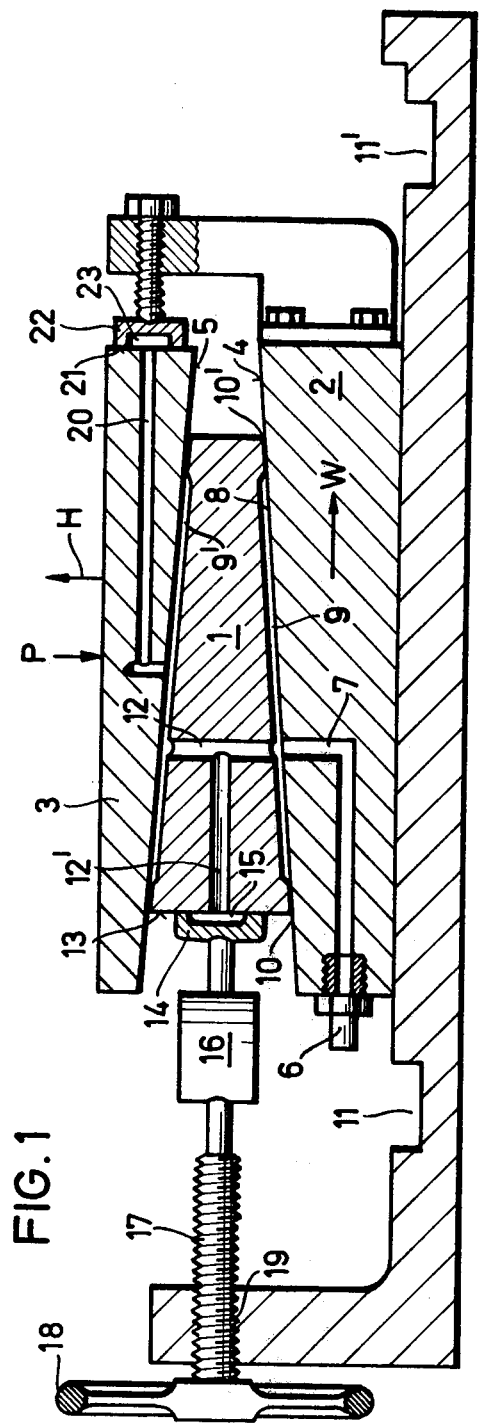
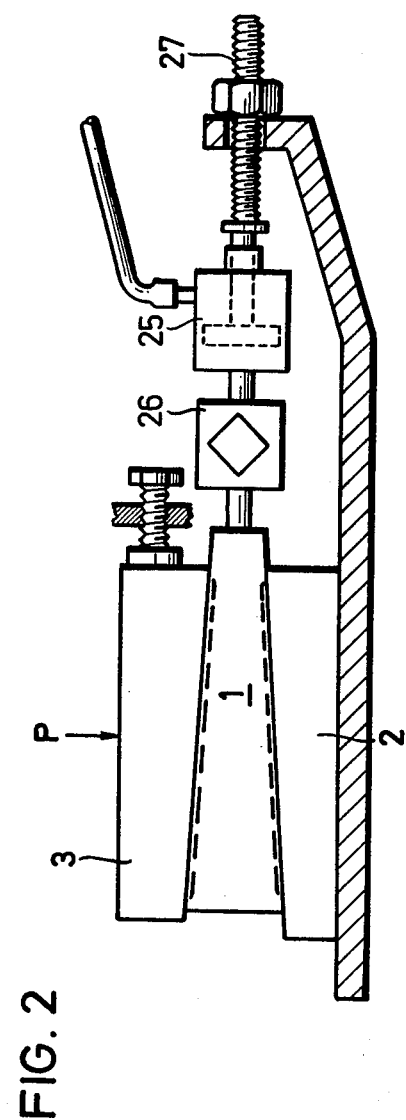
FIG.1
FIG.2

HYDROSTATIC SETTING APPARATUS FOR SUPPORT OF LOADS

BACKGROUND OF THE INVENTION

1. Field of the Invention

The invention relates to a hydrostatic setting apparatus, particularly for setting a device under load.

2. Description of the Prior Art

Hydrostatic setting apparatuses for the support of a hydrostatic bearing point for rotating, particularly heavy machine parts, are known. In such devices, the bearing thrust may be adjusted in the load direction through a hydraulically activatable supporting diaphragm as shown in German Laid Open Specification No. 26 04 889.

This apparatus is limited in its applicability because of the equalization of the bearing air which causes it to have a very short setting path. Further disadvantages are that the prior art devices do not have indicating apparatus for the setting path, and the diaphragm is subject to disturbance and there is an insufficient damping characteristic of the apparatus, particularly with impact load.

SUMMARY OF THE INVENTION

It is an object of the invention, in the case of a hydrostatic setting apparatus, to overcome the listed disadvantages of the known apparatus. Particularly, the setting apparatus of the invention has a greater setting path, and the apparatus has bearings supported on the exterior. The invention can be used in many applications, and is very accurate in setting and indicating the setting path. The device of the invention has an optimum damping characteristic even under impact load. The invention is simple and does not easily break during use. The invention is simple, inexpensive and can be used in many applications.

The apparatus of the invention has at least one power-resolution key-wedge which is coupled by a fluid-operating medium supplied under pressure with preferably one pair of supporting elements having sliding surfaces, and to at least one setting member. The key-wedge and the setting member are arranged in series as a load-chain. At least one supporting element and the end of the load chain opposite the key-wedge have a fixed spacing from each other.

The special advantage of this setting apparatus equipped according to the invention with a power-resolution key-wedge as well as a setting member is the simple manner of operation of the key-wedge. An advantage of the invention is that it has a practically frictionless operating hydrostatic sliding bearing and connection of the setting member which results in a new machine element, which has the following advantages:

It has simple construction and operation. It can be used for very high loads.

It has very low friction and can be cheaply operated.

The invention can be set to larger setting paths, it can be used with a plurality of different machines and apparatuses which have different capacities and have setting-path indicators.

The invention has favorable damping characteristics.

The invention can be prefabricated in different sizes and types,

The invention provides adjustment of the power-resolution components by using different key-wedge angles.

The apparatus has a load chain equipped with a power-measuring device.

This results in advantages, particularly in connection with the power-resolution-characteristic of the hydrostatic key-wedge. Thus, for example, a load may be resolved into components in the ratio for example of 1:10 or 1:100 or 1:1000, whereby the power component required for the setting movement and power measurement is decreased in relation to the main load by these proportionality ratios, without introducing inaccuracy. This allows the power measuring device to be smaller and cheaper relative to the measured power. Thus, the power measuring device, due to the power ratio can be used for testing with economical standard testing apparatuses.

In further development of the apparatus, the load chain has at least two or preferably more key-wedges as well as supporting elements.

This development provides a particular advantage that a large individual load may be divided without difficulties into a number of partial loads, thereby the partial loads of one member of the load chain, consisting of one power-resolution key-wedge and a pair of associated supporting elements are absorbed.

An additional embodiment of the apparatus has a setting member and/or a key-wedge equipped with means for the indication of the setting path.

This embodiment has an advantage due to the indicating means for the setting path because the conical key-wedge operates with the power ratio to provide a transfer path of the power components. For example, a key-wedge with the conical ratio of height to base of 1:10 resolves the power and path in a proportional relation of 10:1.

With an indication scale for the path, a movement of such key-wedge by 10 mm. corresponds to a setting path of the apparatus perpendicularly to this path of one millimeter. The results in this case is a path indication on a scale for the horizontal movement of the key-wedge of a more accurate indication by the factor of 10, of the setting path of the apparatus.

In a development of the apparatus, it is provided that the drive of the setting member occurs selectively either mechanically by electromotor drive, hydromotor drive or by other motor-drive means.

In development of the invention, it is further provided that at least two key-wedges are connected with one another through an operating medium and by sliding surfaces.

One of the possible embodiments provides that the key-wedges are in engagement with each other in an approximately vertical plane. Such an arrangement has the advantage, that the power resolution of the two key-wedges is multiplied.

If according to another embodiment of the invention, the key-wedges are in engagement in approximately parallel planes, then this results, according to the taper shape of each key-wedge, for example, if they have the same taper angles and a corresponding operating path of each key-wedge of a duplication of the setting path of the apparatus.

If, however, the key-wedges have different taper angles, for example 1:10/1:100 of the height to base ratios then different setting paths and corresponding setting forces occur with corresponding translation conditions.

With such an apparatus, it is advantageous if the key-wedge angle and the path-scales are correlated with key-wedges which are the same shape.

Finally, it is an advantage if at least one supporting element is positioned to be movable so as to swing relative to the side facing away from the sliding surface, preferably in a ball and socket joint.

By means of tumbling movement attained with a support element, the sliding surfaces are loaded uniformly over their entire carrying surface, and particularly tilting is prevented.

The apparatus according to the invention provides special advantages due to the utilization of the setting and power-measuring-device for a stand of rolls.

In the case of a stand of rolls, for example, for the cold rolling of band-steel, as for example, automobile-body-sheet-iron, the maintenance of thickness-tolerances in the range of 1/10 to 1/100 mm. is required. The pair of rollers operate in this environment with pressures of the order of size of several 100 tons.

The ordinary adjusting apparatus for the roller spacing utilize large spindles, or hydraulic setting apparatus. An adjustment of the roller gap for example, to 1/10 mm. is difficult with such a device. With an apparatus according to the invention, it is possible for example, with a setting key-wedge of 1:1000, by shifting a key-wedge of 10 mm. to obtain precisely a gap-width-adjustment of 1/100. Thereby due to the power-resolution, the invention allows the setting power for the key-wedge to be selected for a load-drop of 10,000 kg. is only 100 kg.

Such a device has an advantage over the prior art, that the operating pressure of the adjusted roller bearing may be measured in an uncomplicated manner, for example, with a pressure-measuring-cell, if it is connected in the load chain between the movement member and the key-wedge. It is sufficient if its indicating range is for example 0 to 250 kg. and the indicating device output is multiplied by the factor of 1000.

Further advantages of the invention result in the use of a hydrostatic bearing, such as a bearing consisting of several individual supports for a heavy, rotational body having a large diameter.

If here, as in the case of use with the stand of rolls, power measuring devices are arranged in the load-chain, the force acting on each individual support may be measured during operation.

Also, for example, if the key-wedges of each individual support are equipped with hydraulic setting members, which are connected to a common source of pressure, then inaccuracies in the rotation of the rotational body are equalized through the movability of the key-wedge, and automatically a uniform distribution of the radial forces to each of the individual supports is insured, and deviations of the supported body from rotation are completely automatically compensated.

A further advantage results with the utilization of the invention on a testing device operating preferably with pressure or pull, such as a material-testing-device. Testing devices for measured value indicators are known, particularly bureau-of-standards calibration, in the form of so-called "load-towers". The costs of such devices is very large. Such load-towers require, in order to be independent of dynamic influences of the environment, that they have completely insulated foundations with several hundred tons of mass. The towers must have heights up to 30 m., must have a high rigidity and must have a high self-damping characteristic. These extreme requirements lead in practice to very expensive structural devices which may cost many millions of dollars and no longer practicable.

With an apparatus according to the invention, this expenditure may be reduced to a small fraction of such prior towers.

Another use for the setting apparatus of the invention is in the broad field of material testing, for example, with an apparatus for test cube pressure. With kinematic inversion, for example by means of a traction-yoke, the setting apparatus may also find use in material testing machines, in which, for example, tear-tests are done.

An especially suitable and advantageous utilization of the invention is with long weighing bridges. Such weighing bridges are for example required at so-called construction point-vehicle-scales, in which for example, complete heavy-loaded-vehicles with trailers are weighed. Often such weighing bridges have lengths up to 30 meters or more.

The invention is particularly advantageous in this application because the weighing bridge may be laid on a load chain composed of a plurality of individual setting apparatuses. By way of example, an arrangement may be used in which at spacings of several meters, a pair of supporting elements are arranged with each having one key-wedge in the load chain. The results are a very much lighter construction for the actual weighing bridge, and appreciable costs savings. Further advantages are an extremely low structural height and an optimal damping behavior of the vehicle-scale.

Another application of the invention is weighing apparatus for extremely heavy individual objects. Such individual objects may weight several 100 to several 1000 tons.

In this connection, the apparatus in this case has the advantage that the sensitivity of a weighing device equipped with the apparatus, in contrast with prior weighing apparatuses is independent of the size of the so-called "preload" or "dead load". The invention opens possibilities of the application in a new technical region which previously was considered impossible. For example, it would be possible to apply a complete blast furnace with the entire foundation with a total weight of several thousand tons to a plurality of setting apparatus according to the invention, in order during the operation to detect its contents due to its weight, and at the same time to carry out a leveling of the object with the setting apparatus.

Other similar examples of the applications of the invention can be considered, for example, the support of a large silo for pulverized raw material for cement weighing 1000 tons can be weighed which was previously not possible.

The invention allows supervision of the filling of a rotary kiln for cement work or the filling of a large ball mill by detecting the weight.

The apparatus according to the invention operates practically free from friction, its indicating accuracy up to the largest weights is accurate within the tolerances of the indicating device.

On account of these extraordinary and surprising characteristics, there results a special case where the heavy object can be supported according to the invention preferably with the same load as on a greater number of hydrostatic setting apparatuses.

In order to illustrate a clear example of application of the invention, the foundation of a building could be lifted and with suitable measurements could be brought into the vertical position.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 shows a hydrostatic setting apparatus with a load-chain = wedge key/setting member/power-measuring-device, partly in section;

FIG. 2 shows the same apparatus in altered arrangement wedge-key/setting member, likewise partially in section;

DESCRIPTION OF THE PREFERRED EMBODIMENTS

Figure 3:
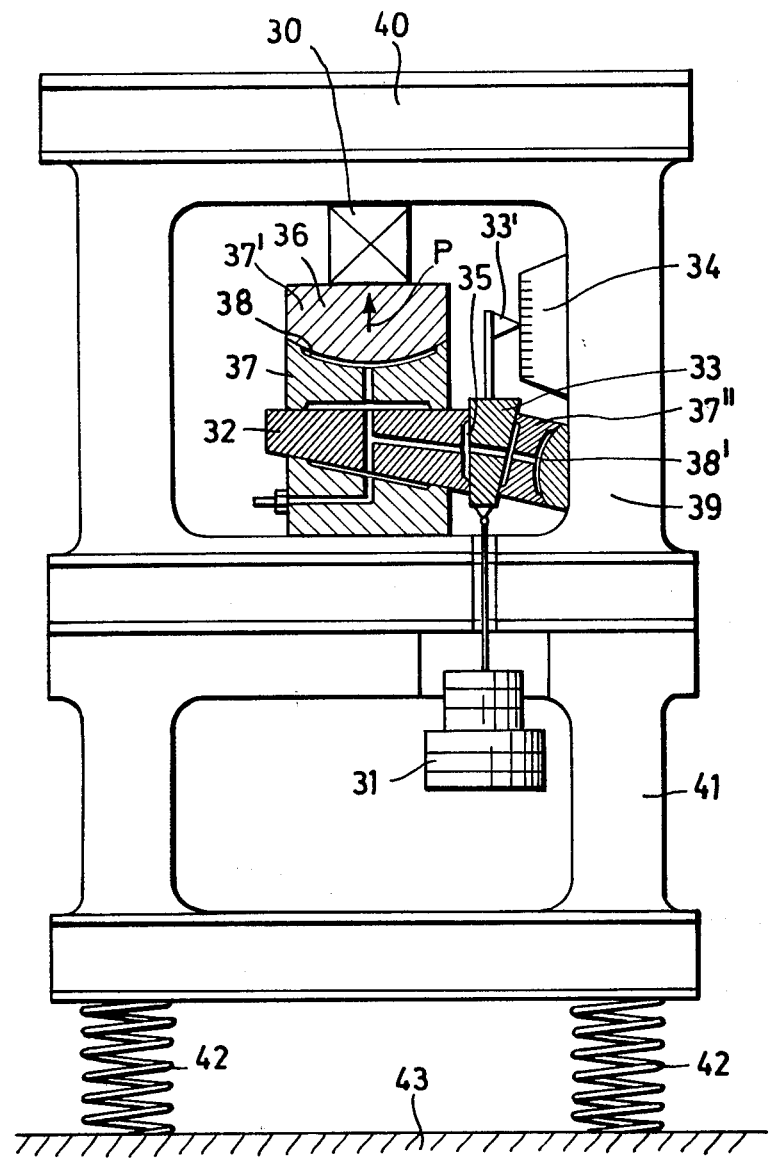
FIG. 3 shows an apparatus for the testing and calibration of electronic measuring-value-indicators, in side view.

As shown in FIG. 1, the setting apparatus according to the invention comprises the wedge key 1, which is movably mounted between the two supporting elements 2 and 3. The supporting elements 2 and 3 have the sliding surfaces 4 and 5, on which the wedge key 1 slides without friction, floating on a film of liquid. The film of liquid is an operating medium such as oil under pressure which is supplied from the fluid connection 6 through the pressure oil conduits 7, 12, 12' and 20 to the sliding surfaces 4, 5, 8, 13, 21. The sliding surface 8 of the wedge key 1 lying opposite the sliding surface 4 has at least one pocket-shaped recess 9, within which the oil under pressure spreads out. After a determined oil pressure is reached, the oil lifts wedge key 1 and passes freely through the gaps 10, 10', after which it is collected in the collection grooves 11, 11', and flows again to a storage container, not shown, which has a pressure oil pump. From the oil well 9, the oil arrives through the conduits 12, 12' within the wedge key 1, and to the oil well 9' on its upper side, and to the front side sliding surface 13. This front side sliding surface 13 is in effective contact with the supporting element 14 which also has at least one oil well 15. The wedge key 1 forms a load chain through the supporting element 14 with the power measuring indicator 16 and the mechanical setting member 17, which in the present example comprises a spindle 19 actuated with the hand wheel 18.

The upper supporting element 3 which receives the load P receives pressure oil from the upper oil well 9' and conveys the same through the bore 20 to a front side sliding surface 21, with which the supporting element 3 is supported horizontally against the guide element 22, without friction, because it slides on an oil film.

The apparatus operates in the following manner:

As long as no oil pressure exists, the wedge key 1 between the two supporting elements 2, 3 is clamped due to the load P in a tight body closure. After the pressure oil is inserted through the connection 6 and the conduits 7, 12, 12' and 20, the pockets or wells 9, 9' as well as 15 and 23 are filled with pressurized oil. In this condition, all of the sliding surfaces (4, 5, 8, 8', 13, 21) are lifted from each other and they float on an oil film. This causes the friction to be extremely low, and it corresponds to the pure liquid friction, whose frictional factors go toward zero, as soon as the movement speed between the two sliding surfaces separated by the oil film becomes infinitely small. The force P taking effect in the present case on the wedge key 1 through the supporting elements 2, 3 is resolved by the wedge key 1 as a function of the taper angle of the wedge key into horizontal and a vertical components having a ratio of 1:10. As the wedge key according to FIG. 1 possesses a taper of 1 to 10, the sliding surface 13 exerts through the power measuring indicator 16 a force of P/10 on the supporting element 14. Upon a movement of the wedge key 1 with the use of the hand wheel 18 and the spindle 19 by a path length of W for example one centimeter, accordingly a setting thrust H is produced by the setting apparatus, which causes a movement of one millimeter.

In the embodiment according to FIG. 2, the wedge key 1 is arranged between the supporting elements 2 and 3. It forms with the hydraulic setting member 25 and the electronic expansion strip measuring indicator 26 as well as with a mechanical screw-spindle adjusting device 27, a load chain taking effect in the pull direction. The device of FIG. 2 functions otherwise equivalent to that of FIG. 1.

FIG. 3 shows a "load tower" according to the invention for the calibration of a power-measuring-indicator 30 with the aid of a set of the most exact testing weights 31, which have in the present example the function of a setting member. The testing apparatus is equipped with two wedge-keys 32 and 33 with the wedge-key 33 supporting the testing weight 31, and indicates its movement with a measuring apparatus 34 for the setting path with pointer 33. By providing the wedge-keys 32 and 33 with different angles, the measuring range of the measuring device may be expanded as desired. The load effect of the testing weights 31 on the wedge-key 33 will be transferred and multiplied by the ratio of the taper factor of the wedge-key 33, to the front side 35 of the wedge key 32 and to the upper supporting element 36. Element 36 consists of two parts, a lower ball cup or socket 37 and an upper spherical segment 37', which together form a ball and socket joint 38 and assure that the test load P is transferred without sliding off of the test sample 30. The wedge key 33 is supported against a supporting element 37" which likewise introduces through a ball and socket joint 38' the lateral force into the uprights 39 of the machine frame 40. The testing device stands further on a base plate 41, which on its part is supported through oscillation-compensators 42 in a manner free from oscillation on the foundation 43, and is free from dynamic influences of the environment.

For the function of the testing device it is necessary that the exact power resolution ratio of the double-wedge-key-arrangement be determined once and for all with the use of super-accurate testing weights 31 and a calibrated test sample 30. Afterwards, the testing sample without further tests can be accurately used for the calibration of further test samples 30.

Figure 4:
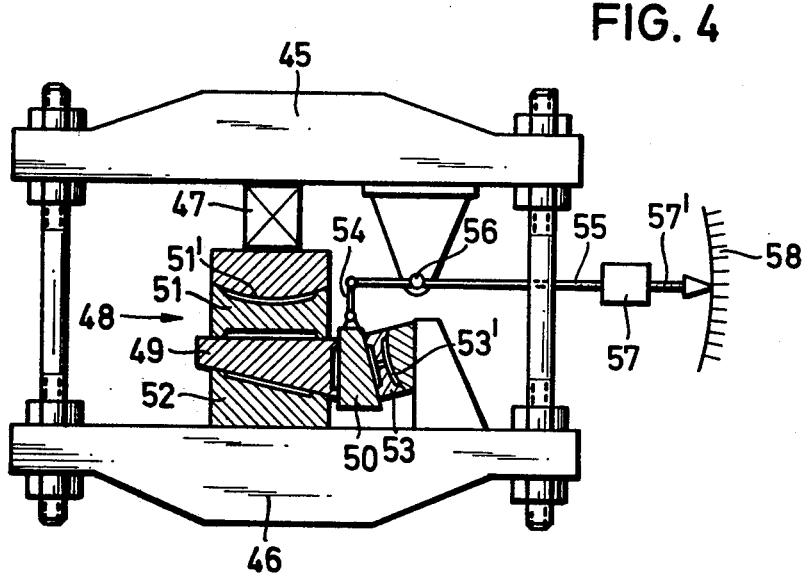
FIG. 4 shows an apparatus for the carrying out of test cube pressure samples in lateral view.

The arrangement according to FIG. 4 shows a test device for carrying out so-called cube-pressure-tests. Between the two yokes 45, 46, is mounted the test-sample 47 on a setting apparatus 48, according to the invention. The latter comprises the two hydrostatic operating wedge keys 49 and 50 as well as the supporting elements 51, 52 and 53. The supporting elements 51 and 53 are positioned to be movable through the ball and socket joints 51', 53'. A load device with setting path indicator comprises the hinge or link rod 54 and the lever 55 which is supported at the center of rotation 56 from yoke 45. The testing weight 57 is in the present example constructed as a slide-weight, as indicated diagrammatically in FIG. 4. A scale 58 indicates the setting path of the apparatus 48, whereby at the same time the pertaining load may be read on a weight-scale 57' of the slide-weight 57 on shaft 55. The apparatus according to FIG. 4 is a system by way of example, and the construction may be varied in many ways corresponding to different machine forms.

Figure 5:
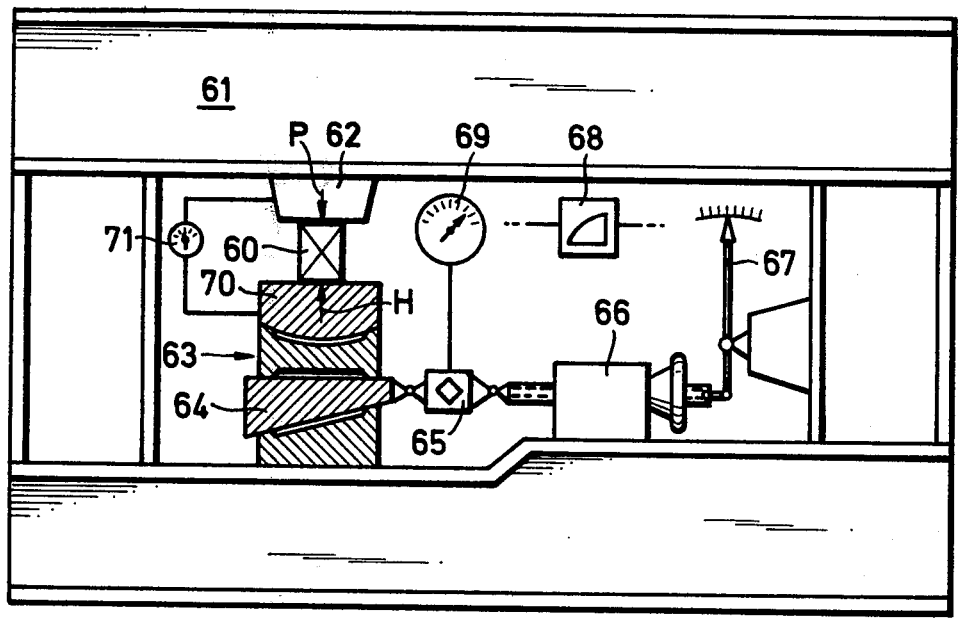
FIG. 5 shows another testing device, for example for electricity measurements, in side view.

An example for such a modified type of construction is shown diagrammatically in FIG. 5.

The test sample 60 is clamped according to the invention in the machine frame 61 between the support 62 and the apparatus 63. The apparatus 63 comprises in the present case the wedge key 64, the load indicator 65 as well as the mechanical and/or selective, electromotor-driven setting member 66 with the device 67 and associated linkage for the indication of the setting path. Additionally, a recorder 68 for a load-path-diagram and a load indicating device 69 are provided. Between the support 62 and the supporting element 70 is arranged a comparison and control micrometer-meter 71, which indicates the deformation of the test sample 60, for example in 1/100 mm.

In the apparatus of FIG. 5, corresponding to similar apparatus, for example, according to FIGS. 3 and 4, due to the mechanical movement of the wedge key 64 there is produced both a setting path approaching H as well as also a testing load P.

Figure 6:
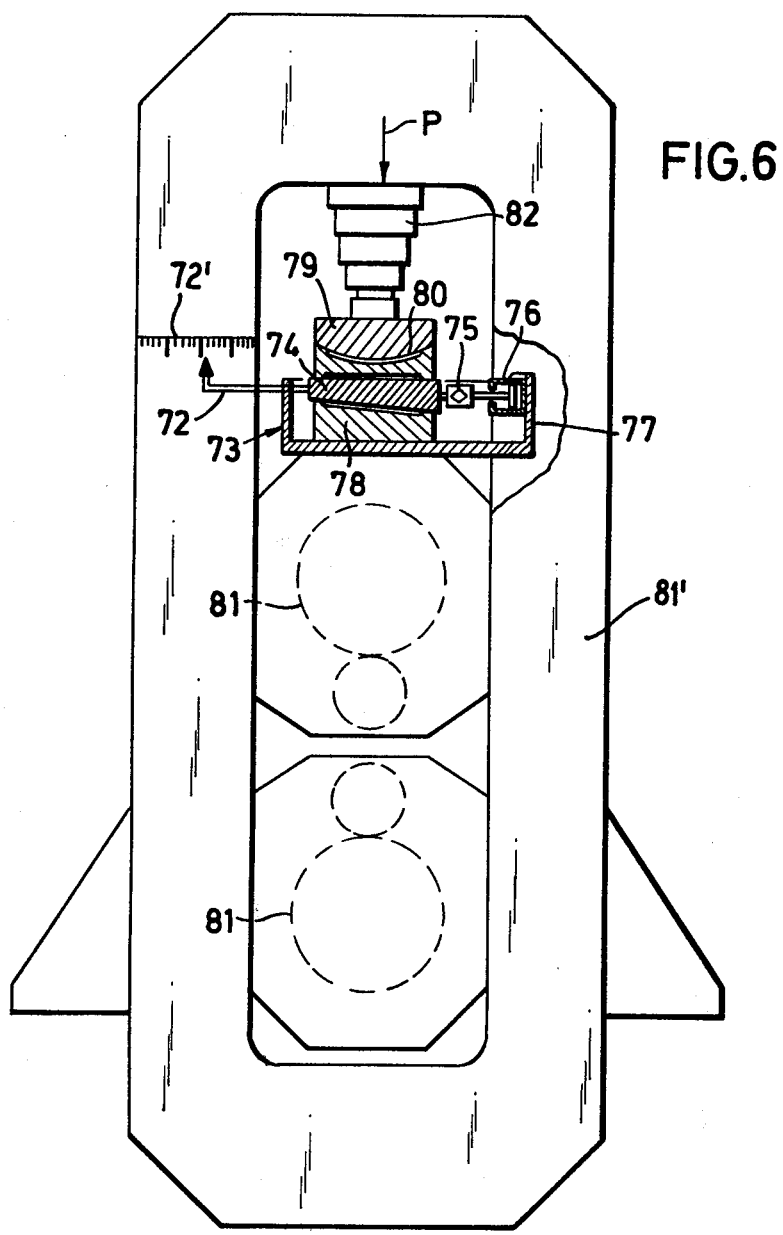
FIG. 6 shows an adjusting apparatus for a stand of rolls, partially in lateral view, partly in section.

FIG. 6 shows an example of the invention having a setting member and power-measuring-device in a roller frame. The apparatus 73 comprises the wedge key 74, the power-measuring-device 75 and the setting member 76, which in the present case is a hydraulic piston-cylinder-unit, and the base plate 77. The base plate 77 serves for providing a definite spacing between the supporting element 78 and the opposite end 76 of the load chain=wedge-key/power-measuring device/setting member 75. The upper supporting element 79 is swingingly movable on a ball and socket joint 80, which provides power transfer without moving off the sliding surfaces. The roller frame 81' has trunnions 81 for example, loaded with a load of several 100 tons, and a first coarse pre-adjustment of the roller gap is accomplished with the aid of the adjusting device 82, which may be for example, an adjusting spindle. During operation, the fine adjustment according to the invention is undertaken with the apparatus 73. In this connection, a wedge-key for example with a taper of 1/1000 provides the possibility of adjusting the setting paths having up to 1/100 mm/accuracy, for which a movement of the wedge key 74 is necessary in the horizontal direction of 10 mm. The path is indicated by the indicator device 72 against the scale 72'. In this example, the setting force amounts to 1/1000 of the work load P.

A further significant advantage compared with the prior art devices results with the utilization of the apparatus 73 on a roller frame, where with the aid of the power-measuring-device 75, the operating pressure P existing during the operating condition of the rollers may be measured. In this manner, for example, in a cold-rolling process it can be determined at what roller stage a material has been rolled to a desired size and an intermediary annealing is necessary for the normalization of the sheet metal.

A further advantage results in that the roller pressure P measured by means of the power measuring device 75 provides a measurement for the proportional elastic expansion of the entire roller frame.

An expert can in an uncomplicated manner equalize the harmful devictions caused by expansion of the roller gap with the aid of the apparatus according to the invention.

Figure 7:
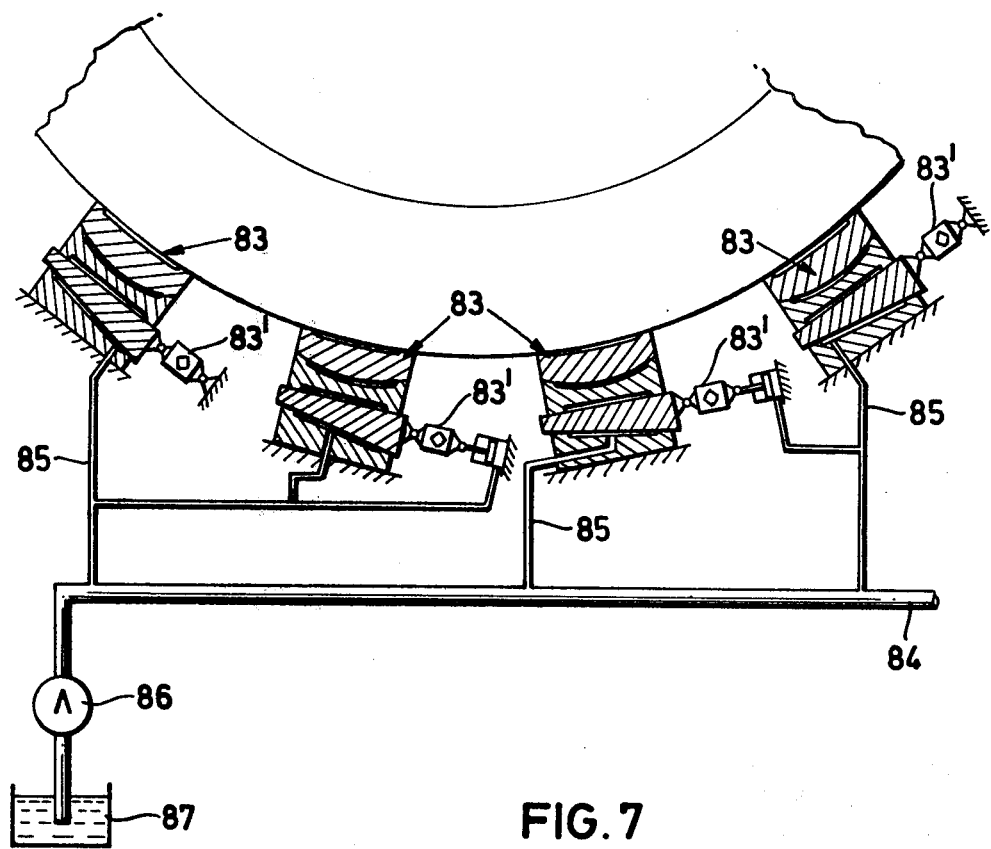
FIG. 7 shows the functioning principle of a hydrostatic bearing for a rotational body of large diameter with measuring and equalization-device, partially in section.

FIG. 7 shows the application of apparatus 83 according to the invention, to a hydrostatic support of a rotating body of large diameter and large mass, for example, to a ball mill. The special feature in this embodiment is the hydraulic interlinkage between the individual apparatuses 83, for example, through the common oil-pressure-conduit 84, to which the individual bearing points 83 are attached with branch conduits 85. The common supply is provided in known manner with the pump 86 from the storage container 87.

The return-flow-conduits of the return oil from the individual bearing points 83 to the common oil-collection-vessel 87 are not illustrated in the diagrammatic drawing, FIG. 7, but merely convey the oil back to the vessel 87.

The special function of this device lies in that with tumbling movements of the supported rotational body on account of unavoidable eccentricity of the same, the individual wedge keys are equalized, so that each individual bearing unit 83 constantly provides the same radial force against the support rotational body. The measured value of the force is transferred by the load-cells 83' to a desired indicating device. Alternatively, after-adjustments could take place with ordinary regulating means, for example, depending on the measurement of the load-indications.

Figure 8:
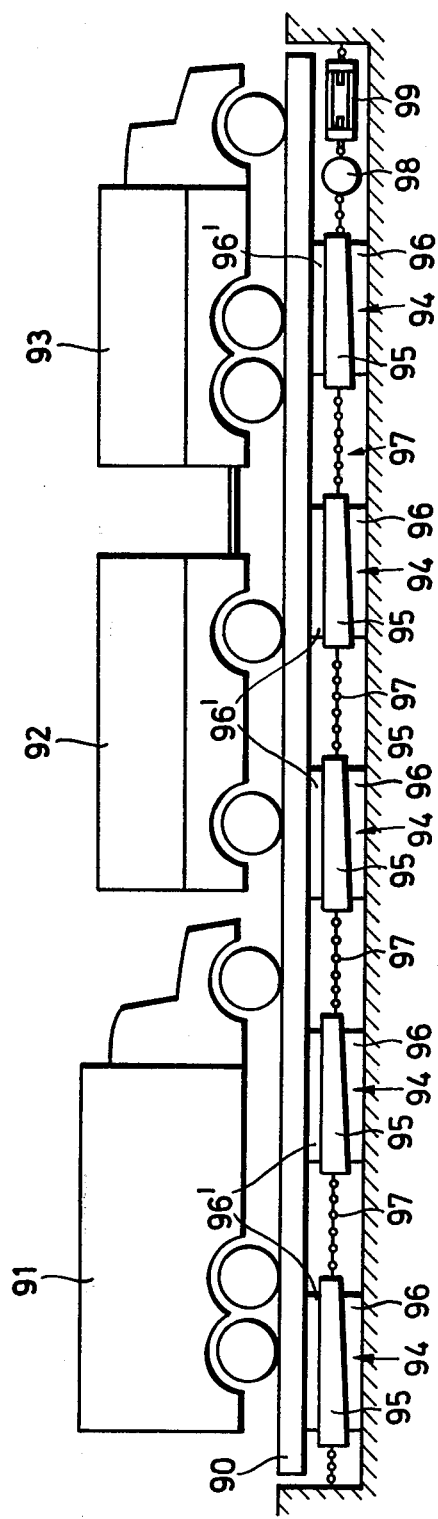
FIG. 8 shows a building point scale with a number of hydrostatic setting apparatus in a load chain, partially in plan view, partly in section.

A further example of application shows according to FIG. 8, long construction-site-scales with the weighing-bridge 90. For the illustration of the size conditions, by way of indication trucks 91, 92, 93 are shown, whose weight are to be determined with the aid of the weighing bridge 90. The length of such a building-site-scale lies for example is in the of order of 40 to 50 m. The weighing bridge 90 is supported on a load chain, which consists of a series connection of individual setting apparatuses 94, according to the invention. Each of these setting apparatuses 94 comprises a power resolution wedge-key 95 and a pair of supporting elements 96, 96' having sliding surfaces. The wedge-keys 95 are connected through connecting elements, for example chain member 97 with a common load chain, which has at one end the power-measuring device 98 and the setting member 99.

In the load chain are added the individual loads up to a total load, which is indicated by the power measuring device 98. A weighing bridge may for example, be disposed on several parallel load chains, whereby each load chain has a power-measuring device 98. The total weight of the weighing bridge 90 to be determined is then combined from the sum of the loads indicated by each power measuring device 98 of each load chain.

The arrangement according to FIG. 8 has for a weighing bridge 90 the great advantage of an extremely small construction as well as a support for the weighing bridge 90 on a plurality of individual hydrostatic setting apparatus 94. Therefore, the weighing bridge 90 in relation to similar weighing bridges according to the prior art may be extremely small and light as there are no extreme requirements on the inherent rigidity of the weighing bridge 90. In addition, the addition of a large number of similar, individual hydrostatic setting apparatuses 94 according to the mechanical assembly technique, offers the possibility of extra-ordinary flexibility in the construction, for example, of an entire series, in that extensing or shortening of the weighing bridge 90 with a more or less similar hydrostatic setting apparatuses 94, can be made from standard similar without many static load calculations being required. In the simple manner of construction, it is possible to produce a weighing bridge 90 equipped with rails, and having a length of an entire freight-train of for example 100 m. length which could be disposed thereupon and weighed.

Figure 9:
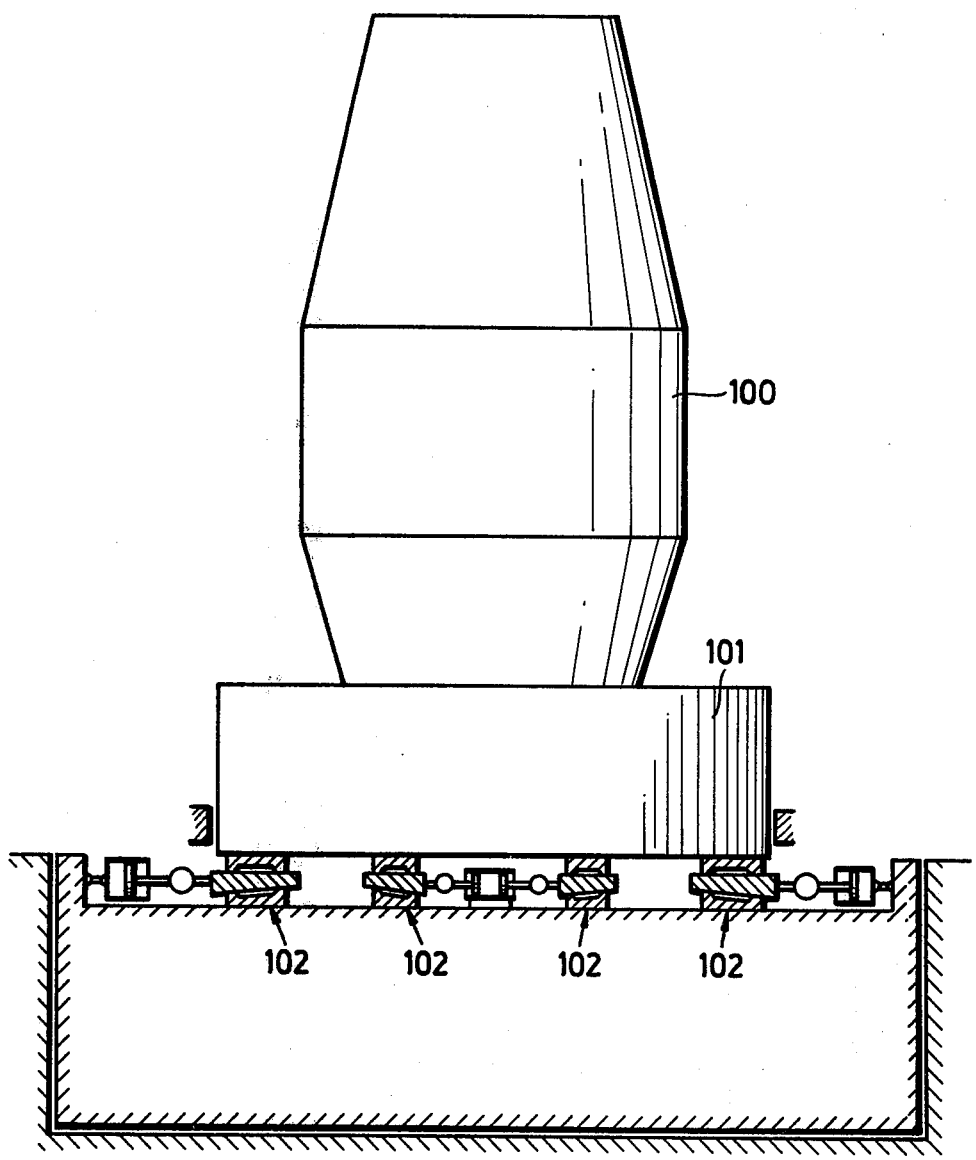
FIG. 9 shows a large individual load, for example a blast furnace on hydrostatic setting apparatus, in side view.

FIG. 9, illustrates another application which shows for weighing large and heavy individual loads, as for example, a blast furnace 100; which together with its foundation 101 is supported on hydrostatic setting devices. With such a device, with correspondingly large wedge-keys with a taper of, for example, 1:1000, it would be possible with the invention to register continuously the operational weight of a blast furnace 100 duting operation.

Figure 10:
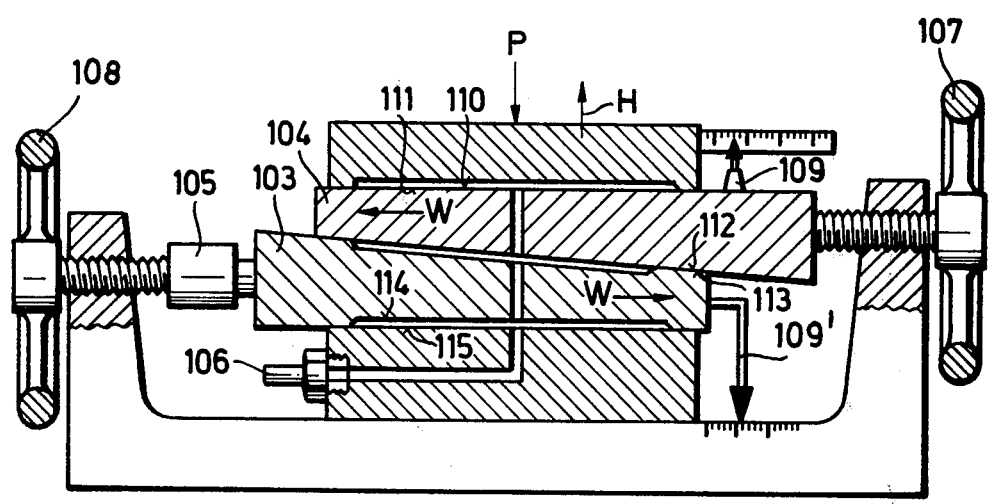
FIG. 10 shows a double key arrangement in section.

FIG. 10 illustrates a modified form of a hydrostatic setting apparatus according to the invention with two wedge keys 103, 104. In the special case shown, both wedge keys may be equipped with identically similar tapers of, for example, 1 to 10. They are equipped with movement path-indicating apparatuses 109, 109'. For the load measurement in the example shown, the arrangement of a power-measuring device 105 and one single oil-supply-point 106 are sufficient. The apparatus comprises the setting member illustrated purely diagrammatically as hand-adjusting spindles 107, 108. Upon adjustment of one of the two wedge keys 103 or 104 by a determined operating path with force W, a thrust H of 1/10 of the operating path W is produced. The load P is resolved according to the taper of the wedge-keys in the ratio of 1:10. The particular feature of the apparatus according to FIG. 10 is that on account of the arrangement of two wedge-keys 103, 104, with adjustment on both sides by the same operating paths W, and W' a thrust H coresponding to each of these operating paths W and W' is attained in the end results. Thus, a doubled throust H at the same adjusting force P is obtached. The apparatus comprises the sliding surfaces 110, 111, 112, 113 114, 115 and oil is provided through supply conduit 106.

As illustrated, the new machine element of the invention of a hydrostatic setting apparatus, both with different types of construction and for different uses, is not limited to the examples described and shown. The invention can be in many respects, and the fields of application in the broad field of the art is unlimited. Thus, also applications with heavy, tension-releasing tool machines on steel holders are possible where it may be advantageous to adjust the cutting tool precisely and to measure the force 5 acting on the tool.

A further example is a slabbing scale where for example, a rocker-device is brought from a position of rest with fixed supported load-take-up-stage by means of raising the stage to operating position. In the prior art separate function-units were necessary, such as hoisting unit/weighing devices. With the invention, lifting and weighing along is possible with the hydrostatic setting apparatus, of the invention without a separate hoisting unit.

All such and further applications and variations of embodiments are encompassed by the invention as described by the appended claims.

I claim as my invention:

1. A fluid load measuring apparatus which is suited in particular for measuring the load on a body using fluid bearings supporting the body whose load is to be measured, comprising, several individual fluid bearing elements in contact with said body, and each bearing element including a wedge key and upper and lower mating elements which are movably mounted on a fluid film which is supplied under pressure between the sliding surfaces of said key and said mating surfaces, fluid supply means connected to all of said fluid bearing elements to apply fluid at a common pressure to all of said bearing elements, and a plurality of load measuring means respectively connected to said plurality of fluid bearing elements such that the sum of the loads measured by said load measuring means is equal to the load of said body.

2. Apparatus according to claim 1 wherein each of said wedge keys is connected to means for indicating the load on said fluid bearing element.

3. Apparatus according to claim 1 characterized in that said mating elements have on the sides which are opposite to key engaging sliding surfaces pivotably movable surfaces such as a ball and socket joint.

4. Apparatus according to claim 1 characterized when used for weighing bodies in the order of the magnitude of several hundred to several thousand tons said body is supported upon a large number of bearing elements.

* * * * *